United States Patent [19]

Muraishi

[11] 4,008,919
[45] Feb. 22, 1977

[54] TILTABLE SEAT LATCH DEVICES
[75] Inventor: Masakazu Muraishi, Tokyo, Japan
[73] Assignee: Nissan Motor Co., Ltd., Yokohama, Japan
[22] Filed: May 14, 1975
[21] Appl. No.: 577,553
[30] Foreign Application Priority Data
  May 20, 1974  Japan ........................ 49-58035[U]
[52] U.S. Cl. ............................................ 297/331
[51] Int. Cl.² ....................................... B60N 1/10
[58] Field of Search ......... 297/440, 331, 455, 456, 297/443, 379, 313, 445; 296/66, 69; 292/87, 303

[56] References Cited
UNITED STATES PATENTS

| | | | |
|---|---|---|---|
| 2,153,155 | 4/1939 | Page et al. | 297/331 X |
| 2,956,837 | 10/1960 | Koplin | 296/66 |
| 3,171,685 | 3/1965 | Hershberger et al. | 297/440 X |
| 3,807,790 | 4/1974 | Erard | 296/66 |
| 3,811,725 | 5/1974 | Bauer | 296/66 |
| 3,822,911 | 7/1974 | Radke et al. | 296/66 |
| 3,915,493 | 10/1975 | Brown | 292/303 X |

FOREIGN PATENTS OR APPLICATIONS 1,221,043  1/1960  France .................................. 296/66

*Primary Examiner*—James T. McCall

[57] ABSTRACT

A seat rear end is provided with a projection member yieldably held in its projected state. The seat is retained in its horizontal position by engagement of the projection member with an upstanding backrest.

6 Claims, 8 Drawing Figures

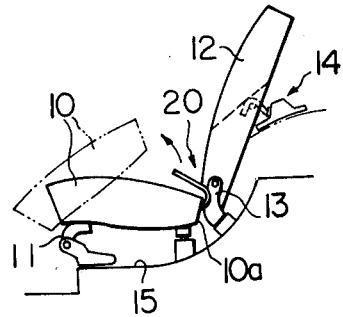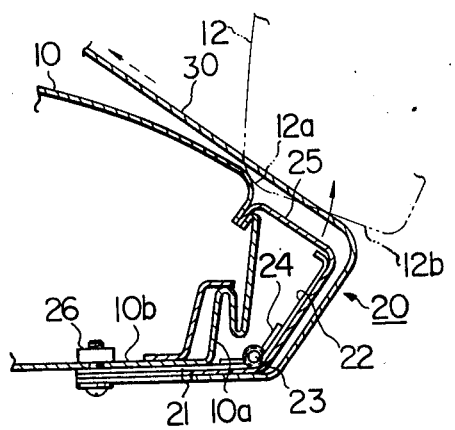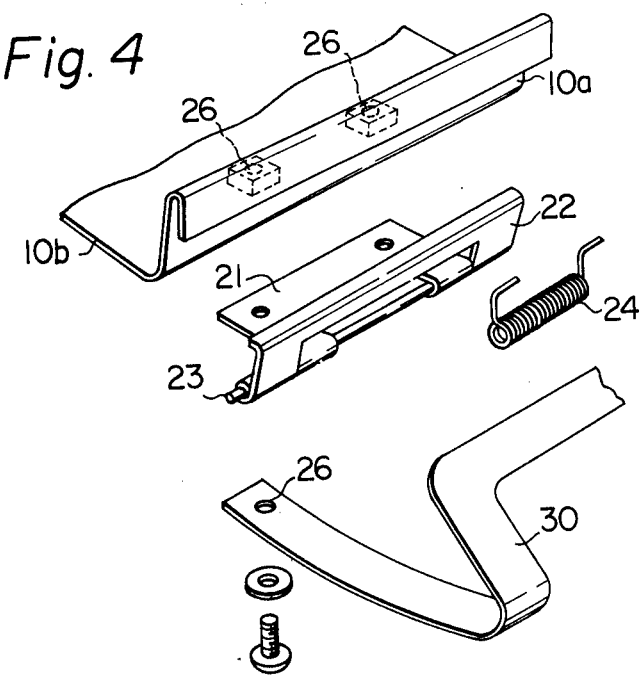

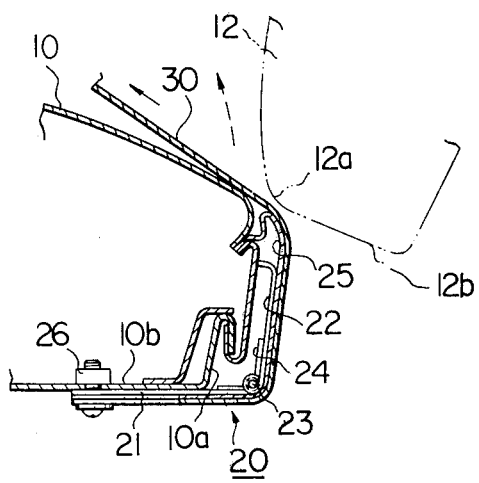
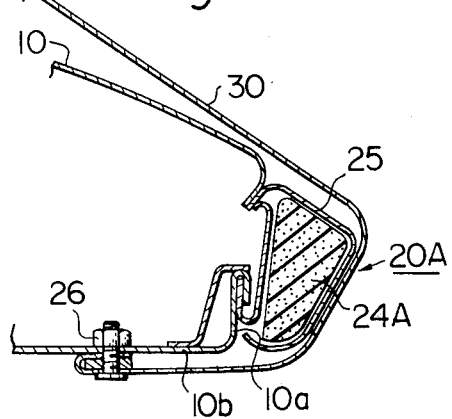
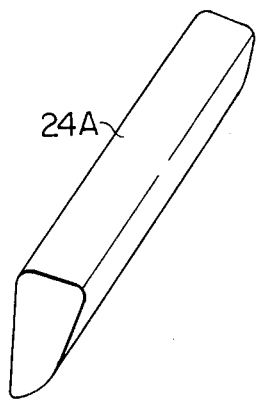

TILTABLE SEAT LATCH DEVICES

This invention relates generally to seat structures with horizontal seats and separate backrests and particularly to latch devices for tiltable or hinge-movable seats for such seat structures.

It is a general object of this invention to provide an improved self-acting latch device for holding a hinge-tiltable seat in its horizontal riding position preventing accidental movement to its upright position.

Another object of this invention is to provide a seat with the latch device of the above mentioned character.

Still another object of this invention is to provide the latch device of the above mentioned character which is easily mountable to a stationary seat carrying structure without precise adjustments of its constituent elements being required.

A further object of this invention is to provide such arrangement of the self-acting latch device as to enable easier latching operation of the seat member merely by turning the seat member to the horizontal riding position.

Other objects, features and advantages of the present invention will appear in the following description and appended claims, reference being had to the accompanying drawings forming a part of this specification wherein like reference characters designate corresponding parts in the several views.

FIG. 2 is a side elevation of a seat with any preferred embodiment of the latch device according to the present invention;

FIG. 3 is an enlarged section view of a preferred embodiment of the latch device incorporating the present invention showing its latching position;

FIG. 4 is a detail perspective view of disassembled parts of the device shown in FIG. 3;

FIG. 5 is a view similar to FIG. 3 showing the unlatched or released position of the device;

FIG. 6 is an enlarged section view of another preferred embodiment of the latch device incorporating the present invention; and FIG. 7 is a perspective view of an essential part of the embodiment shown in FIG. 6.

Figure 1A:
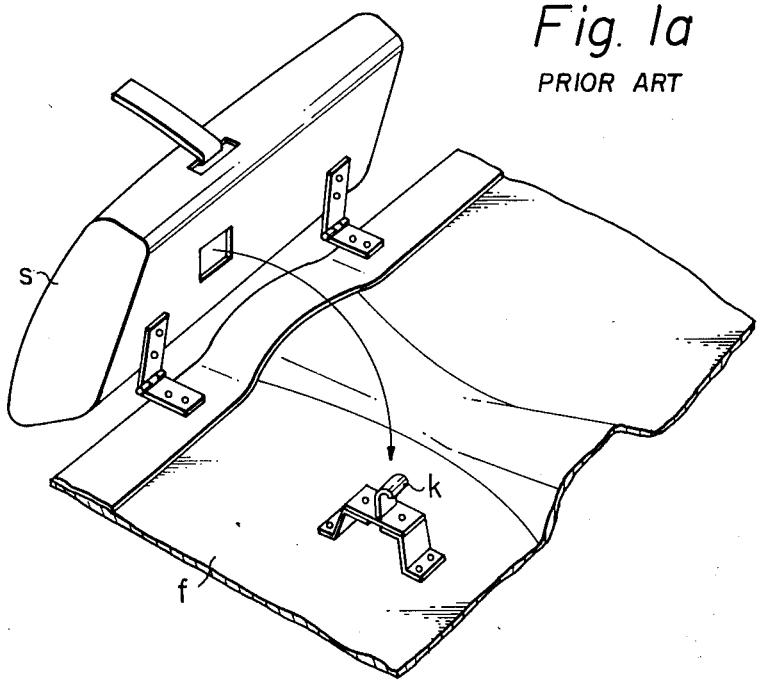
FIGS. 1a and 1b are perspective and section views of a seat with a prior art latch device, to which reference is made for comparison with the device according to the present invention in terms of their structural and operational differences.
Figure 1B:
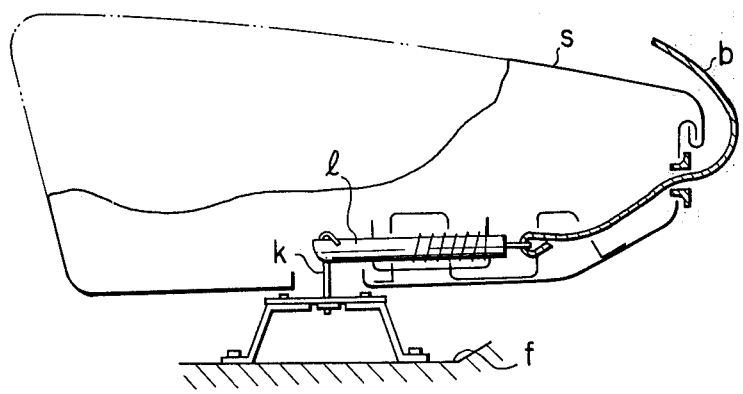

In FIGS. 1a and 1b, the seat $s$ is of the type hingedly connected at its front end to a stationary seat carrying structure $f$. The seat $s$ is therefore hingedly movable between horizontal and upright positions and occasionally further toward an opposite prostrate position across the upright position. Seats of this type are particularly feasible for such motor vehicles as passenger cars and station wagons and the seat referred to in this description is taken as an example when mounted on such a vehicle body floor.

Conventionally, the latch device for holding the hinge-movable seat $s$ in horizontal position is typically arranged as illustrated: A keeper hook $k$ is fixed to a bracket rigid with vehicle body floor $f$ and upon latching a latch element $l$ spring-loaded to latching position snaps into the keeper hook $k$, preventing undesired swinging of the seat out of the horizontal position. Unlatching is accomplished by retracting a manually remote-controllable cable or belt $b$ connected to the latch member $l$ to release it from the keeper hook.

One of the most serious problem involved in such device is that when assemblying and mounting such device, it requires worker's attentive effort to keep the keeper and latch in exact alignment. Still probable slight misalignment between the two members will result in failure in successful latching. Moreover in such device, not only is the seat itself to be treated for mounting the latch device, but also the vehicle floor or other seat carrying structure has to be particularly manufactured for supporting the bracket or the like, requiring an increased cost and number of manufacturing processes. Besides, upon latching the seat, the operator of such device has to hold the retracting belt by his hand in controlled retraction during angular movement of the seat until the latch snaps into the keeper, therefore a relatively heavy muscular movement by the operator's hand is necessary.

This invention, as will be described later in detail, proposes an advantageous solution to these and other difficulties. With reference to FIGS. 2 to 5 inclusive depicting a preferred embodiment of the present invention, the usually upholstered seat cushion 10 is of the type, as already described, hingedly connected at 11 to the vehicle floor 15 through a bracket (no number) so as to be pivotal to the upright position indicated by phantom line in the arrow-indicated direction of the drawing. A separate backrest 12 is preferably also hingedly-mounted at 13 to a bracket (no number) fixed to the vehicle floor for pivotal movement to its horizontal position. A front bottom end 12a of the backrest 12 is therefore positioned closely above the rear end 10a (looking in normal riding position) of the seat cushion 10 or may removably rest upon the same. The backrest is usually locked in upstanding position by suitable latch means 14 of conventional nature and when the seat cushion is in the upright position, the backrest may be swung to the horizontal position.

The latch device 20 according to this invention is attached to the rear end face 10a of the seat cushion 10 at a part of or throughout the width of the seat cushion. With particular reference to FIGS. 3 and 4, the latch device comprises a bracket 21 bolted or riveted at 26 to the bottom 10b of the seat cushion, two spaced arms (no number) of the bracket extending rearward out of the bottom of the seat cushion. A support plate 22 is pivoted by means of a pin 23 received by the arms so that the support plate is freely movable about the pin toward and away from the rear end face of the seat cushion. A helical spring 24 is wound around the pin 23, the both extended ends of which are anchored respectively to the support plate 22 and the bracket 21, thus urging the support plate 22 in a direction apart from the rear end face 10a of the seat cushion. The support plate 22 is enclosed by a deformable or collapsible confinement 25 extending along the outside of the support plate, the upper and lower peripheries of which are rigidly secured to the top and bottom sides of the rear end faces of the seat cushion. The confinement 25 serves to determine the angular position of the support plate biased by the spring.

The latch device as a unit thus forms a projection yieldably held in a projected latching position beneath the bottom surface 12b of the backrest in a face-to-face relationship. Consequently even if an impact force is exerted to the seat tending to pivot it up forwardly, the seat cushion is securely held in the horizontal position by means of the latch device 20 retained under the backrest. To move the seat cushion held upright to the horizontal latched position in the direction opposite to the arrow, the operator or occupant has only to apply a light load upon the seat cushion by his hand or by his body weight just as he seats himself. Thereupon, the latch device 20 passes the front bottom end 12a where the helical spring 24 yields through pressure contact with the front bottom end of the backrest. Upon further such movement of the seat cushion, the latch device is released from engagement with the front bottom end 12a, advancing to the underside of the backrest, whereat the latch device is resiliently restored to the projected latching position. Latching operation is thus self-actingly completed.

For unlatching the seat cushion from the horizontal position, there is provided a manually retractable belt 30 anchored at 26 to the bottom of the seat cushion. The belt 30 extends encompassing the confinement 25 toward the front portion of the seat accessible to the operator. As best seen in FIG. 5, when the operator exerts a pull upon the retracting belt 30 in the arrow-indicated direction, the latch device 20 is urged to a flattened unlatching position while compressing the helical spring 24. The latch device is thus released from the backrest allowing free pivotal movement of the seat cushion out of the horizontal position in the direction indicated by a broken line arrow. Further retraction of the belt 30 then shifts the seat cushion 10 to the upright position. If desired, the seat cushion may be designed to be automatically turned up to the upright position as soon as the latch device is released from the backrest by the retracting belt, though not shown.

FIG. 6 shows another preferred embodiment of a latch device 20A according to which a resilient elastomeric block 24A is tightly enclosed in the confinement 25 similar to that of the first embodiment. The resilient block 24A is made of suitable material such as moulded urethane rubber for providing spring action like the helical spring 24 in the above mentioned embodiment. Of necessity, this embodiment dispenses with either the spring support or the bracket. The operation of this preferred embodiment is substantially identical with that of the first embodiment, the detailed explanation thereof being therefore not given for brevity. As clearly seen in FIG. 7, the resilient block 24A is shaped like a triangular prism which is most convenient for operation of such latch device. It is preferable to similarly configure the assembled latch device 20 or 20A itself in either embodiment described.

Obviously, the latch devices described hereinabove is even more easily manufacturable, mountable and operable than conventional latch devices. Besides, such devices provide an additional feature that if the latch device, with the confinement made of the material like the upholstery of the seat cushion, is formed throughout the width of the seat cushion, no appreciable gap is left between the backrest and the seat cushion in the event that these are slightly offset from their regular positions, affording a neat appearance of the seat.

What is claimed is:

1. A seat comprising a seat member having one lateral side hingedly connected to a stationary structure for pivotal movement between a horizontal position and a certain angular position and having an opposite side, an upstanding backrest having a bottom abutting side resting upon the opposite side of the seat member, and an yieldable latch member rigid with the opposite side of the seat member and hold in a projected latching position by means of the bottom abutting side when the seat member is in said horizontal position, said latch member being resiliently deformable by engagement with the bottom abutting side of the backrest to be released from the latching position during pivotal movement of the seat member.

2. A seat as claimed in claim 1, comprising manually operable means to retract the seat member to said certain angular position to cause the latch member to be deformed during said pivotal movement of the seat member.

3. A seat as claimed in claim 1, in which said latch member comprises a support member fixed to the opposite side of the seat member and having a portion pivotally movable toward and apart from the opposite side of the seat member, and spring means resiliently urging the pivotally movable portion to said latching position apart from the opposite side of the seat member, and a deformable confinement extending along the outside of the pivotally movable portion and fixed at its periphery to the opposite side of the seat member to confine the pivotally movable portion to a predetermined angular position.

4. A seat as claimed in claim 3, further comprising a manually retractable belt having one end fixed to the seat member and extending along the outside of said confinement in a direction of pivotal movement of the seat member toward said certain angular position, whereby said latch member is resiliently deformable to pass the bottom abutting side by manual retraction of said belt together with the seat member toward said certain angular position.

5. A seat as claimed in claim 1, in which said latch member comprises a deformable confinement fixed at its periphery to the opposite side of the seat member and an elastomeric block received in said confinement resiliently biasing the confinement to an expanded state.

6. A seat as claimed in claim 5, further comprising a manually retractable belt having one end fixed to the seat member and extending along the outside of said confinement in a direction of pivotal movement of the seat member toward said certain angular position, whereby said latch member is resiliently deformable to pass the bottom abutting side by manual retraction of said belt together with the seat member toward said certain angular position.

* * * * *